United States Patent [19]

DiCarlo et al.

[11] Patent Number: 4,506,523
[45] Date of Patent: Mar. 26, 1985

[54] OIL SEPARATOR UNIT

[75] Inventors: Leonard J. DiCarlo, Maryland Heights; Roland A. Ares, St. Charles; Robert O. Norton, Chesterfield, all of Mo.

[73] Assignee: Hussmann Corporation, Bridgeton, Mo.

[21] Appl. No.: 599,468

[22] Filed: Apr. 12, 1984

Related U.S. Application Data

[62] Division of Ser. No. 442,967, Nov. 19, 1982, Pat. No. 4,478,050.

[51] Int. Cl.³ .............................................. F25B 43/02
[52] U.S. Cl. ..................................... 62/470; 210/168; 55/459 R
[58] Field of Search ................. 62/468, 469, 470, 471, 62/472, 473, 84; 210/168, 512.1; 55/421, 423, 459 R

[56] References Cited

U.S. PATENT DOCUMENTS

| | | |
|---|---|---|
| 441,995 | 12/1890 | Wheeler .............................. 62/193 |
| 2,511,967 | 6/1950 | Campbell ..................... 210/512.1 X |
| 3,304,697 | 2/1967 | Ramsey ............................ 62/473 X |
| 3,633,377 | 1/1972 | Quick ................................... 62/192 |
| 3,778,984 | 12/1973 | Lawsen ............................... 62/470 |
| 4,263,029 | 4/1981 | George ............................... 210/168 |

Primary Examiner—Harry B. Tanner
Attorney, Agent, or Firm—Richard G. Heywood

[57] ABSTRACT

An oil separator unit for use in an oil separation and return system for the compressor means of a refrigeration system, including a unitary oil separation and oil accumulator vessel having an upper vortex separation chamber, oil collecting and separating means, vapor deflector means, oil precipitation means, and a lower oil accumulator chamber for receiving and holding liquid oil.

5 Claims, 7 Drawing Figures

OIL SEPARATOR UNIT

This application is a divisional application based upon co-pending parent application Ser. No. 442,967 filed Nov. 19, 1982, U.S. Pat. No. 4,478,050.

BACKGROUND OF THE INVENTION

The invention relates generally to the commercial and industrial refrigeration art, and more particularly to an oil separator unit for commercial and industrial refrigeration systems.

The maintenance of a proper amount of lubricating oil in the compressor of any refrigeration system obviously is a critical factor to the efficient operation and life span of the compressor. Oil problems are particularly acute in large multiplexed or compounded systems in which multiple compressors operate in parallel or series-piped arrangements and pump into a common discharge header to provide the refrigeration needs of commercial installations, such as supermarkets which have a large number of low and/or normal temperature refrigerated display and storage fixtures, or for industrial installations, such as warehousing having a plurality of different refrigeration requirements.

In all operating refrigeration systems, some amount of oil is entrained in the hot compressed refrigerant vapor discharged by the compressors and generally some oil is present throughout the entire system, including condenser, receiver, evaporator coils, liquid and suction lines, valves, etc. It is clear that compressor lubricating oil serves no useful purpose outside the compressor, that energy is wasted by pushing oil through the refrigeration system, that oil interfers with the heat transfer and efficiency of evaporators and that oil may create system damage due to oil build-up interferring with proper refrigerant distribution, valve operation and the like. Therefore, high side oil traps or separators have been employed between the compressor and condenser to separate the oil from the refrigerant that is passed on to the condenser and thus minimize such oil distribution through the system. It is desired to return the oil in liquid form to the compressors and various high side and low side oil devices have been used, such as sumps, accumulators, pumps, oil float controls, valves and the like.

Refrigerants such as R-12, R-22 and R-502 are miscible with the lubricating oil, and generally some amount of refrigerant will be present in any oil separation system. However, in prior oil separator systems, the cooling of separated oil below the condensing temperature of the gas refrigerant frequently produced excessive refrigerant condensation in and dilution of the oil. Such oil and refrigerant solution results in reduction of lubrication quality and excessive pump-out of the oil into the system. Excessive oil foaming also occurred in some cases of crankcase pressure reduction such as during compressor start-up following a long off-cycle. In addition to problems of inefficient oil-refrigerant separation, a major problem has been the maintenance of proper oil levels between multiple and cyclically operating compressors. A typical solution in the past was to return the oil to the suction header for the compressors and allow the oil to vaporize into the warm refrigerant vapor and flow at random into the compressors without regard to different pumping rates, and then attempt to provide an oil level equalizing connection between the compressor crankcases, such as is disclosed in U.S. Pat. No. 3,140,041. U.S. Pat. No. 3,633,377 also discusses a high side oil separator, accumulator and muffler for a multiple compressor system that approaches some of the oil problems.

While numerous oil separation devices and systems have been developed in the past, efficient oil separation and maintenance of proper oil levels in multiple compressor systems has continued to present oil problems in refrigeration systems.

SUMMARY OF THE INVENTION

The invention is embodied in an oil separator unit for commercial refrigeration systems and the like having multiple parallel compressors that are cyclically operable to meet the refrigeration demands of the system, the oil separator unit including a vortex oil separation chamber disposed between the compressor discharge header and condenser means for the refrigeration system, an oil reservoir for receiving oil from the separation chamber, and means intermediate the separation chamber and oil reservoir to reduce the separated oil to liquid form.

A principal object of the present invention is to provide an oil separator unit having a highly efficient oil-refrigerant separator and liquid oil reservoir.

Another object is to provide an oil separation system that obviates oil flooding and starving in the compressor and maintains a substantially constant supply of oil to the compressor crankcase.

Another feature of the invention is to provide for the separation and accumulation of oil in a unitary separator-accumulator vessel, and to substantially eliminate oil vapor or fog in the accumulator portion thereof.

Another object is to provide an efficient, easily serviced and economic oil system for a multiple compressor refrigeration system.

These and other objects and advantages will become more apparent hereinafter.

DESCRIPTION OF THE DRAWINGS

For illustration and disclosure purposes the invention is embodied in the parts and the combinations and arrangements of parts hereinafter described. In the accompanying drawings forming a part of the specification and wherein like numerals refer to like parts wherever they occur.

DESCRIPTION OF THE PREFERRED EMBODIMENTS

For purposes of disclosure, a closed refrigeration system embodying the invention has been illustrated and will be described as being of the multiplexed type having dual or twin parallel compressors and which might be installed in a supermarket for operating a plurality of separate fixtures, such as refrigerated storage and display cases, but it will be understood and readily apparent to those skilled in the art that such a system may have other numbers and arrangements of compressors and may be adapted to other commercial or industrial installations. The term "high side" is used herein in a conventional refrigeration sense to mean the portion of the system from the compressor discharge to the evaporator expansion valves and the term "low side" means the portion of the system from the expansion valves to the compressor suction.

Figure 1:
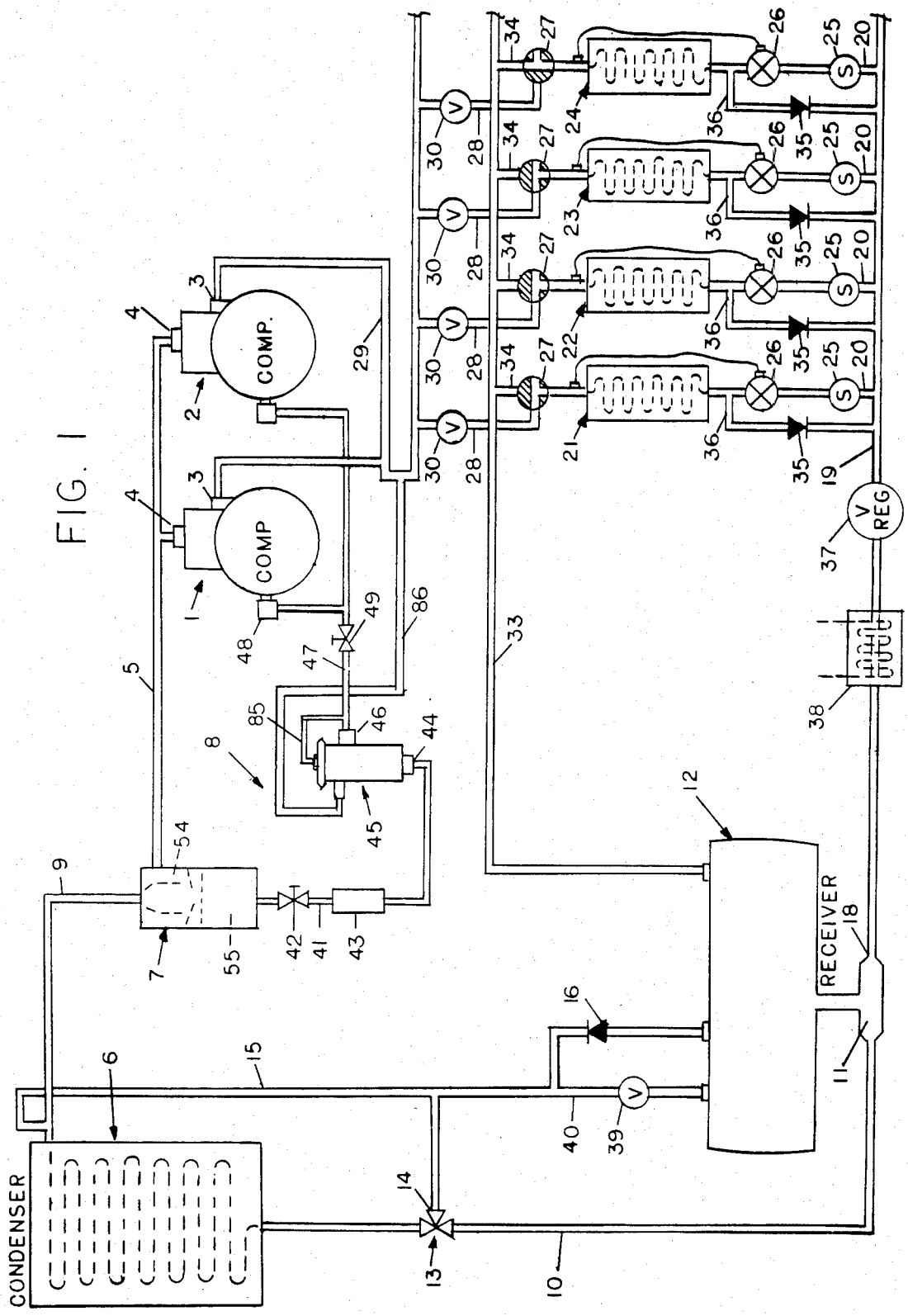
FIG. 1 is a diagrammatic view of a typical refrigeration system embodying the invention.
Figure 2:
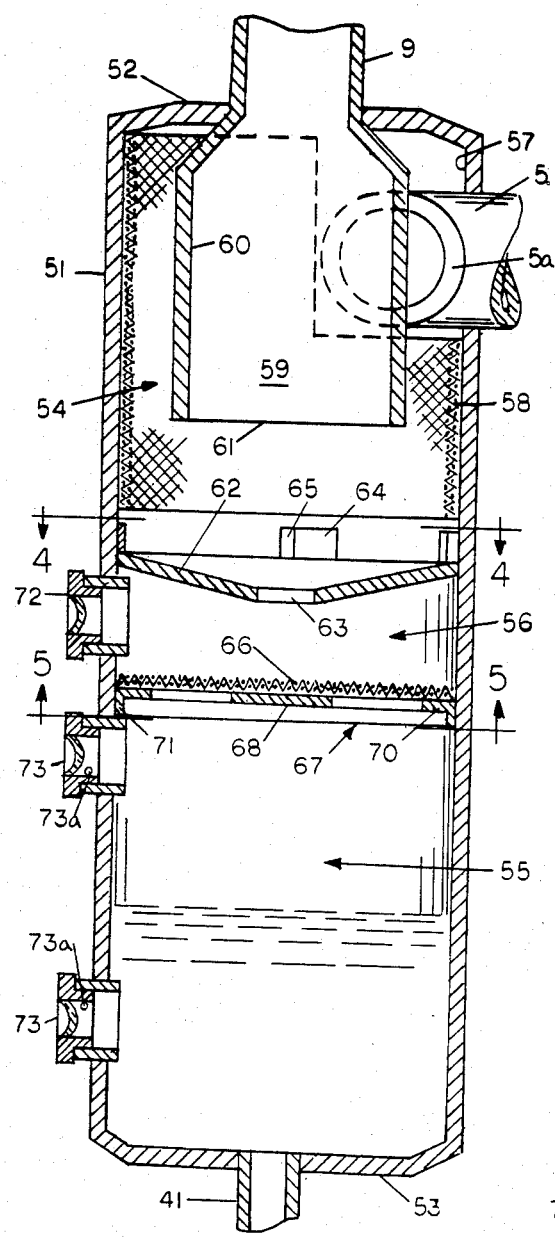
FIG. 2 is an enlarged cross-sectional view of an oil separator and accumulator unit embodying the invention.
Figure 3:
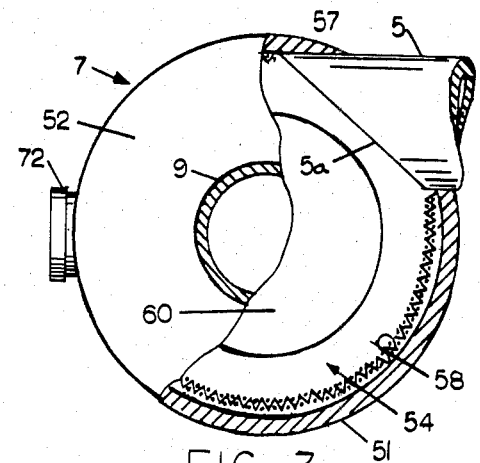
FIG. 3 is a top plan view, partly broken away, of the oil separation unit of FIG. 2.
Figure 4:
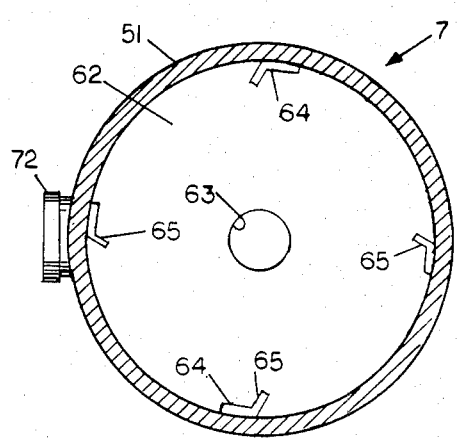
FIG. 4 is a cross-sectional view taken substantially along line 4—4 of FIG. 2.
Figure 5:
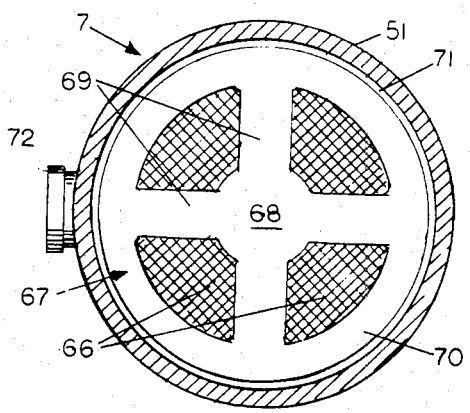
FIG. 5 is a cross-sectional view taken substantially along line 5—5 of FIG. 2.

Referring to FIG. 1, the refrigeration system shown is in part conventional and includes a pair of compressors 1 and 2 connected in parallel and each having a suction or low pressure side with a suction service valve 3 operating at a predetermined suction pressure and having a discharge or high pressure side 4 connected to a common discharge header 5 through which hot compressed gaseous refrigerant is discharged to a condenser 6. The discharge header 5 is connected to an oil separator 7 of an oil separation system 8 embodying the present invention and to be described more fully hereinafter, and a refrigerant outlet from the oil separator 7 is connected to discharge conduit 9 connected to the condenser 6. Thus, the oil separation system 8 is disposed in the refrigerant discharge connection between the compressors and the condenser, as will appear. The refrigerant is reduced to its condensing temperature and pressure in the condenser 6 which is connected by a conduit 10 to an enlarged T-connection conduit or base 11 forming part of a surge-type receiver 12 forming a liquid refrigerant source for operating the system. A pressure responsive flooding valve 13 may be provided in the conduit 10 and operates in response to a head pressure pilot control 14, which is connected to a pressure equalizing line 15 between the receiver 12 and condenser 6, to restrict condensate flow from the condenser and produce variable condenser flooding to maintain compressor head pressures at or above a preselected minimum. The equalizing line has a check valve 16. The outlet 18 of the receiver 12 is connected to a liquid header 19 for conducting liquid refrigerant to branch liquid lines or conduits 20 leading to evaporator coils 21, 22, 23 and 24 associated with different refrigerated fixtures (not shown) and being representative of numerous evaporators connected into the refrigerant system. The branch liquid line 20 of each evaporator 21, 22, 23 and 24 is provided with a solenoid valve 25, and expansion valves 26 meter refrigerant into the evaporators in a conventional manner. The outlets of the evaporators are connected to three-way valves 27 and, under normal refrigerating operation, are connected through these valves and branch suction lines or conduits 28 to a suction header 29 connected to the suction side 3 of the compressors 1 and 2 and through which vaporous refrigerant from the evaporators is returned to the compressors to complete the basic refrigeration cycle. Evaporator pressure regulator (EPR) valves 30 are shown interposed in the branch suction lines 28 to illustrate that the suction pressure on the evaporator coils 21, 22, 23 and 24 can be adjusted so that the respective refrigerated fixtures can operate at different temperatures within the range of the suction pressures established by the compressors 1 and 2.

The refrigeration system so far described operates in a conventional manner in that each fixture evaporator absorbs heat from the fixture or its product load thereby heating and vaporizing the refrigerant and resulting in the formation of frost or ice on the evaporator coils. Thus, the refrigerant gas returned to the compressor has a cumulative latent heat load in excess of the amount of heat required to defrost one or more of the evaporators 21, 22, 23 and 24. A hot gas defrosting system includes a main gas defrost header 33 connected to the top of the receiver 12 for conducting saturated gaseous refrigerant selectively to the evaporator coils and is connected through branch defrost lines or conduits 34 to the three-way valves 27, the three-way valve for the evaporator 24 being shown in defrost position. In other words, in the gas defrost arrangement shown, the sensible and latent heat of gaseous refrigerant at its desuperheated or saturation temperature is used for defrosting the evaporators and saturated gaseous refrigerant flows through the header 33, the branch line 34 and the three-way valve 27 into the evaporator coil 24 (or another selected evaporator) for heating and defrosting the coil thereby condensing the refrigerant to a liquid as in a conventional condenser. The solenoid valve 25 is closed to isolate the defrosting evaporator from its normal refrigeration connection to the liquid line 19, and a check valve 35 is provided in by-pass line 36 around the expansion valve 26 to return the defrost condensate to the liquid line 19 as taught by U.S. Pat. No. 3,150,498 so that such refrigerant is immediately available for use in the normal operation of the refrigerating evaporators. A pressure reducing or regulating valve 37 is positioned in the liquid header 19 between the branch liquid supply lines 20 and the receiver 12 or its flow-through T-connection 11 to effect a downstream pressure reduction in the range of 10-20 psig in the liquid line 19 relative to the pressure in the defrost header 33, and the liquid header may also be provided with a conventional evaporative sub-cooler 38 for preventing flash gas as a result of the liquid line pressure reduction through the pressure regulator valve 37. In addition, as the compressor discharge line 9 downstream of the oil separation system 8 is connected by the equalizing line 15 to the receiver 12, a pressure regulating valve 39 may be provided in a branch conduit 40 also connected to the receiver 12 in by-pass relation to the one-way check valve 16 to maintain a substantially constant head in the receiver and a continuous supply of saturated gas during defrost operations. The construction and operation of the system so far described will be fully understood by reference to U.S. Pat. No. 3,427,819.

Figure 6:
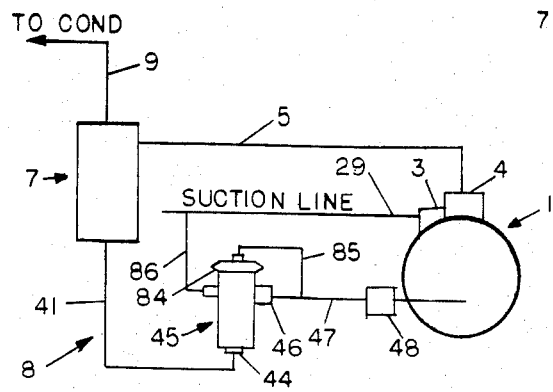
FIG. 6 is a line diagram illustrating an oil separation system connected with a pressure differential valve useful with the invention.

The oil separation system 8 shown in FIGS. 1, 6 and 8 includes the oil separator unit 7 embodying the present invention, which in its preferred form includes an integral oil reservoir to be described. Oil separated from the refrigerant in the oil separator portion and collected in the reservoir portion of the separator unit 7 is returned to the compressors 1 and 2. An oil line 41 connects the bottom of the reservoir through a service valve 42 and filter 43 to the inlet 44 of a pressure differential valve 45, which has an oil outlet 46 connected by an oil return line 47 to conventional oil float valves 48 sensing the oil level in the respective compressor crankcases and controlling the amount of oil returned thereto. Another service shutoff valve 49 is interposed in the oil return line 47 downstream of the pressure differential valve 45. The function of the pressure differential valve 45 is to reduce the high pressure prevailing in the oil separation unit 7 to a pressure slightly greater than the suction pressure of the compressors 1 and 2 to regulate oil flow into the oil return line 47 and prevent overfeeding of the oil float valves 48.

Referring now particularly to FIGS. 2-5, the oil separation unit 7 comprises a generally cylindrical main housing 51 having an upper end cap or wall 52 and a lower end cap or wall 53 forming a closed vessel, which includes an upper vapor receiving and oil separating chamber 54, a lower oil accumulator or reservoir chamber 55 and an intermediate oil precipitating or liquifying chamber 56. The compressor discharge header 5 is connected into the separator chamber 54 tangentially with the inner side wall surface 57 of the housing 51 and has a beveled or angled inlet opening 5a to create a circular or centrifugal vortex action of the refrigerant-oil discharge vapor within the upper chamber 54. A sleeve member 58 of foraminous material, such as approximately 20 mesh screen, covers the inner wall surface 57 substantially throughout the length of the upper chamber 54, except for the area of the inlet opening 5a, and the compressor discharge into the separator chamber 54 impinges against this coarse screen surface to induce adherence of oil particles thereon. It will be understood that other coarse and/or perforated materials may be substituted for the screening 58. As such oil particles accumulate on and through the screen member 58, the oil will seep or run down the inner wall surface 57 toward the intermediate chamber 56 and accumulator 55. Centrifugal separation of oil particles from the refrigerant vapor by vortex action within the separator chamber is enhanced by an enlarged refrigerant intake chamber 59 communicating with the discharge line 9 leading to the condenser 6. The refrigerant intake chamber is defined by a bell housing or central column or sleeve 60 substantially larger in diameter than the conduit 9 and extending coaxially downwardly in the separation chamber 54 so that the oil-refrigerant separation area of the chamber 54 comprises the annular channel area between the bell housing 60 and the screened side wall 57,58. The outlet sleeve 60 has an open bottom 61 disposed above the lower portion of the screen member 58. The lower end of the separation chamber 54 has a frusto-conical wall member 62 having a central opening 63 defining the oil outlet from the separation chamber 54, the member 62 forming an oil collector and concentrating the flow of oil to the intermediate chamber 56. A series of baffle or deflector plates 64 are annularly spaced around the top of the collector member 62 and have outwardly angled deflector tabs or elements 65 to create vortex regeneration in the lower portion of the chamber 54 above and adjacent to the oil outlet opening 63 thereby assisting in the collection and discharge of oil from the chamber 54 and enhancing final separation of refrigerant vapor for its discharge upwardly into the intake chamber 59 of the bell housing 60 leading to the condenser conduit 9.

The intermediate chamber 56 is defined at the top by the collector member 62, and an oil precipitating member 66 and a deflector plate 67 define the bottom of this chamber. The deflector 67 is a wheel-shaped member with an integral hub 68, spokes 69 and annular rim 70 having a peripheral flange 71 secured to the inner side wall 57 of the housing 51. The plate 67 supports the oil precipitating member 66, which may be about 20 mesh screen or some other coarse, disc-shaped, foraminous material, and which collects and spreads out the oil discharged from the separation chamber 54 thereby creating a slight pressure drop between the intermediate chamber 56 and the accumulator chamber 55. The primary function of the oil screen member 66 is to precipitate or condense oil into a liquid form so that this oil will pass to the accumulator reservoir 55 in the form of liquid oil droplets, and oil fog or vapor will be substantially eliminated from the reservoir 55. The intermediate or precipitating chamber 56 is provided with a conventional sightglass 72 and the reservoir 55 also has upper and lower sightglasses 73, including float balls 73a, to assess oil levels in the oil system. The lower accumulator chamber 55 forms an oil collecting reservoir for storing a supply of liquid oil, and the bottom is connected to the liquid line 41 leading to the acid filter 43 and the oil inlet connection 44 to the pressure differential valve 45.

The oil separator reservoir unit 7 is extremely efficient, in the range of 80-90% efficient in oil separation as compared with the 15-25% oil separation efficiency of prior oil separators, and has no complex float mechanism or other moving parts (except for the ball floats 73a) creating maintenance or service parts. The unit 7 is easily serviced for cleaning in case of a compressor burn-out or other system problem. In cleaning, the refrigeration system is first shut down and the discharge pressure is bled off from the oil reservoir unit by closing the service valve 42 and disconnecting the oil line 41 from the reservoir outlet. Removal of the upper sightglass 72 provides access to the intermediate chamber 56 for fluid pressure cleaning of the screen disc 66, and removal of the bottom sightglass 73 permits any sludge or foreign matter to be cleaned from the reservoir chamber 55. The sightglasses 72 and 73 are then resealed in the vessel wall 51 and the oil line 41 assembled and valve 42 opened for a system check after compressor start-up.

Figure 7:
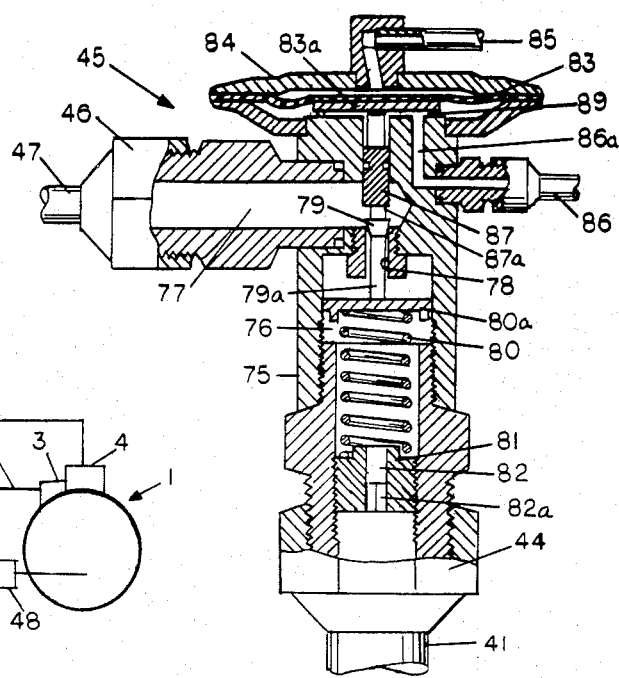
FIG. 7 is an enlarged cross-sectional view of the pressure differential valve shown in FIG. 6.

Referring briefly to FIGS. 6 and 7, one form of an oil pressure differential valve 45 shown is fully described in parent application Ser. No. 442,967 and in a separate divisional application filed concurrently herewith. The valve has a main valve body 75 with a central oil inlet chamber 76 connected to the oil line 41 and an oil outlet chamber 77 connected to the oil return line 47. These chambers 76 and 77 are connected by an oil passage 78 controlled by a valve element 79 biased toward an open oil flow position by pressure spring 80 and opening and closing of the valve element 79 is regulated by a pressure responsive diaphragm 83 mounted in a valve control head 84. The upper surface of the diaphragm 83 is connected to the oil return line 47 through an equalizing line 85 and the lower diaphragm surface is connected to the suction line 29 through an equalizer conduit 86. The purpose of the pressure regulating valve 45 is to reduce the high side pressure acting on the oil levels in the reservoir unit 55 to a preselected value in the range of the low side or suction pressure so that the oil float valves 48 can operate efficiently in controlling oil make-up levels to the compressor crankcases. Thus, an oil inlet pressure of about 175 psig may be reduced to an oil outlet pressure of about 50 psig with a suction line equalization to about 30 psig.

It will be readily apparent that the oil separator unit 7 of the present invention provides a greatly improved, highly efficient oil separation and liquid oil reservoir in an integral vessel. The scope of this invention is intended to encompass such changes and modifications as will be apparent to those skilled in the art, and is only to be limited by the scope of the claims which follow.

What is claimed is:

1. An oil separator unit for use in an oil separation and oil return system for the compressor means of a refrigeration system; said oil separator unit comprising a unitary oil separator and oil accumulator vessel adapted to receive the high pressure refrigerant-oil mixture discharged from the compressor means; said vessel including an upper receiving chamber having a cylindrical wall with a compressor discharge conduit tangentially connected in its upper portion, a separated oil outlet at the bottom of said receiving chamber and a separated refrigerant intake column centrally disposed in said receiving chamber and having a refrigerant vapor outlet at the top thereof, said intake column and receiving chamber wall defining an annular chamber therebetween to receive the high pressure gaseous mixture and effect oil and refrigerant separation therein by centrifugal vortex action, foraminous oil collecting and separating means lining the cylindrical wall of said annular chamber in the vortex flow path of said gaseous mixture, and vapor deflector means adjacent to said separated oil outlet and in open communication with said annular chamber and refrigerant intake chamber for regenerating vortex separating action in said vapor in the final separation zone of said receiving chamber.

2. The oil separator unit according to claim 1, in which said vessel also includes a lower oil accumulator chamber disposed below said receiving chamber for accumulating separated oil therefrom, and foraminous barrier means intermediate of said receiving and accumulator chambers for precipitating oil from vaporous to liquid form.

3. The oil separator unit according to claim 2, in which said foraminous barrier means comprises screening means extending across said oil separator unit below said receiving chamber for laterally dispersing oil particles, and an open frame supporting plate for said screening means.

4. The oil separator unit according to claim 1, in which said separated oil outlet at the bottom of said receiving chamber comprises an oil collector member having a central oil outlet, and said vapor deflector means comprise spaced apart baffle means adjacent to said oil collector member.

5. The oil separator unit according to claim 4, in which said oil collector member is frusto-conical and slopes downwardly to said central oil outlet, and said baffle means are mounted on said cylindrical receiving chamber wall above said oil colletor member.

* * * * *